(12) United States Patent
Gandhi

(10) Patent No.: US 9,317,877 B2
(45) Date of Patent: Apr. 19, 2016

(54) ENABLING THIRD-PARTY E-STORE WITH CARRIER BILLING FOR A MOBILE DEVICE

(75) Inventor: Ashish Gandhi, Brentwood, CA (US)

(73) Assignee: Cellco Partnership, Basking Ridge, NJ (US)

(*) Notice: Subject to any disclaimer, the term of this patent is extended or adjusted under 35 U.S.C. 154(b) by 409 days.

(21) Appl. No.: 13/300,209

(22) Filed: Nov. 18, 2011

(65) Prior Publication Data
US 2013/0132235 A1 May 23, 2013

(51) Int. Cl.
*G06Q 30/00* (2012.01)
*G06Q 30/06* (2012.01)

(52) U.S. Cl.
CPC .................................. *G06Q 30/0601* (2013.01)

(58) Field of Classification Search
CPC .......................................... G06Q 30/06–30/08
USPC ................................................. 705/26.1–27.2
See application file for complete search history.

(56) References Cited

U.S. PATENT DOCUMENTS

2011/0217994 A1* 9/2011 Hirson et al. ............... 455/466
2012/0197731 A1* 8/2012 Rampell et al. ........... 705/14.64

OTHER PUBLICATIONS

Cha, B. "RIM Store Crowned Blackberry App World" (CNet, Mar. 5, 2009).*

* cited by examiner

*Primary Examiner* — Ethan D Civan

(57) ABSTRACT

Techniques and equipment are described for enabling an application developer to provide mobile device users, using the developer's application, an option to purchase digital content items within the application and have the cost of the purchased content billed directly to their respective mobile communications service accounts. The mobile service account for a user or user's mobile device is maintained by a wireless carrier or operator of the mobile communication network to which the user subscribes for mobile communication services. The charges and other transaction details related to the content purchased by a mobile device user via the mobile application on the user's device appear in a billing or account statement periodically provided to the user by the carrier or operator of the mobile communication network.

19 Claims, 7 Drawing Sheets

In-App Content Purchase for E-Stores

ENABLING THIRD-PARTY E-STORE WITH CARRIER BILLING FOR A MOBILE DEVICE

BACKGROUND

The advancement of mobile communication devices and networks in recent years has enabled application developers and content providers to distribute content directly to the mobile device of user via content-specific software applications executed on the device. The software applications may relate to virtually any user interest or need, such as education, entertainment, finance, health, instant messaging, social networking, maps, navigation, music, news, document generation, photography, shopping, sports, travel, utilities, and/or the weather. For example, a user may select a particular application or content item for purchase and download of the item to the user's device through a virtual mobile applications store or other interface on the device. Such an interface may be provided by, for example, the wireless service provider or carrier of the mobile communication network associated with the device.

In addition to being able to offer users a content-specific application for a mobile device, an application developer or content provider is able to offer content for sale to users from within the delivery functionality of an application. The in-app purchasing capability allows developers to sell content within their apps. For example, digital content may be specific to a particular type of mobile communication application running on the mobile device and may include, for example and without limitation, electronic books (or "e-books") in a mobile e-bookstore application, movie rentals in a mobile streaming video application, a level in a mobile video game application, and digital music or ring-tones in a music application. In this example, the digital content is purchased from execution of the application and is delivered to the mobile application from an associated application server through the mobile communication network.

Commercially available solutions exist for allowing mobile device users to make in-app purchases via a mobile application installed on the user's device and for enabling these purchases to be billed directly to the user's wireless service account managed by the carrier. However, such conventional solutions prove difficult for application developers/content providers, particularly those of e-store applications having a multitude of different items for sale, to effectively maintain the delivery of up-to-date or current content to mobile device/application users while also allowing the wireless network carrier to manage billing for the in-app purchases. In an example of an e-store application (e.g., an e-bookstore), the application developer and/or content distributor generally provides to the carrier a catalog identifying the various items (e.g., e-books) that may be purchased on an individual basis by a user. Consequently, the application developer or content provider must continuously update this catalog each time a new item (or new edition of an e-book in the e-bookstore example) is added, and provide the updated catalog to the carrier in order to ensure the user is properly charged for any particular item purchased through the mobile application.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
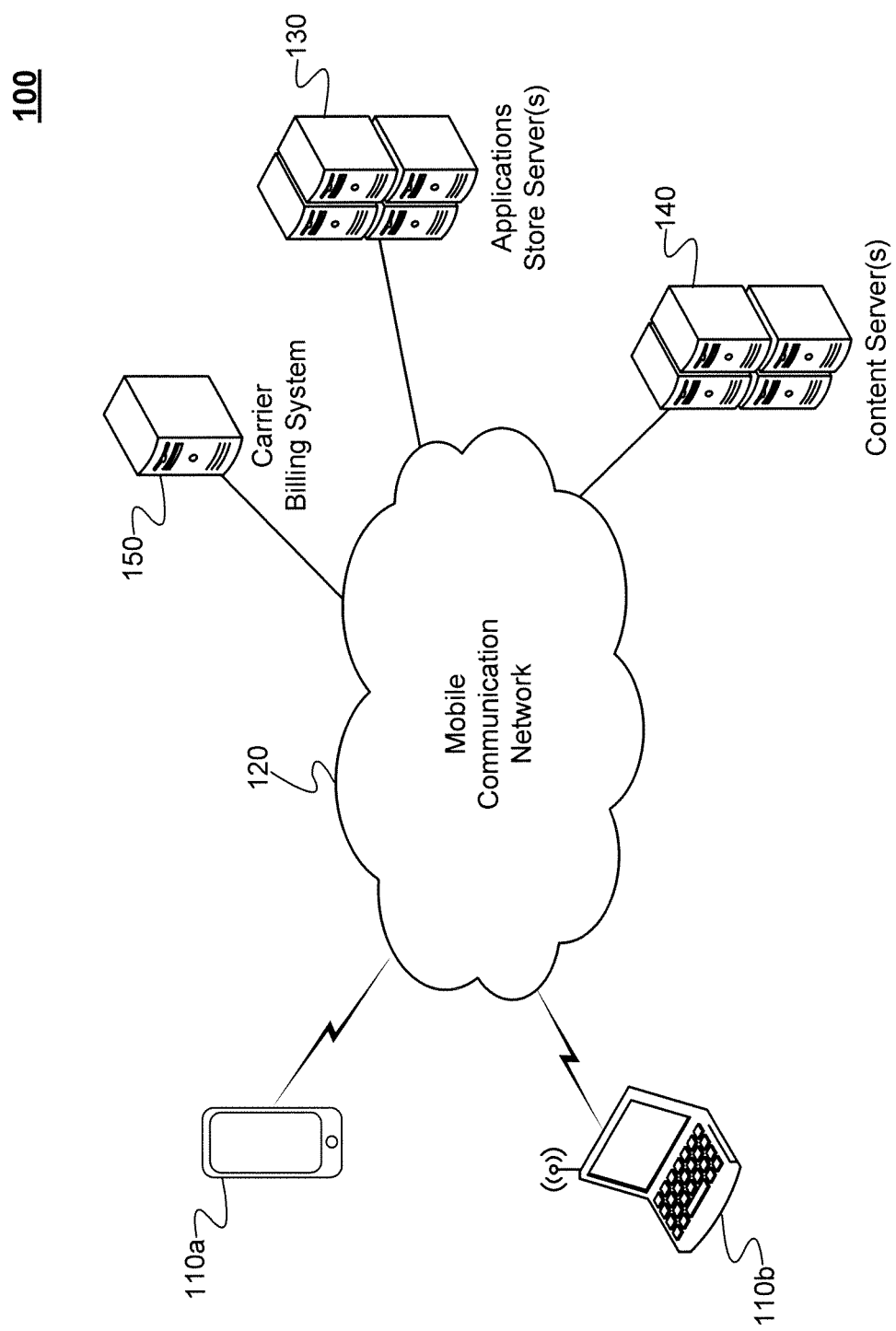
FIG. 1 illustrates an exemplary system for mobile communications between a mobile device and various application or content servers through a mobile communication network.

In the following detailed description, numerous specific details are set forth by way of examples in order to provide a thorough understanding of the relevant teachings. However, it should be noted that the present teachings may be practiced without such details. In other instances, well known methods, procedures, components, and/or circuitry have been described at a relatively high-level, without detail, in order to avoid unnecessarily obscuring aspects of the present teachings.

The teachings disclosed herein enable application developers and content providers to sell content and services within their respective applications and still be able to charge the customers through their wireless or mobile service account.

In an exemplary method, pricing information for content items associated with an electronic store application of a third-party provider is stored at a billing system operated by a carrier of a mobile communication network. A user of a mobile device executing the electronic store application can browse and select one of the content items for purchase via a user interface provided by the electronic store application at the mobile device. The stored pricing information for the content items is sent to the mobile device via the mobile communication network in response to a request from a carrier applications client executing at the mobile device. The request is initiated by the electronic store application based on input from the user via the user interface, and communicated to the carrier applications client via an application programming interface at the mobile device. The carrier applications client is also configured to communicate the pricing information from the carrier billing system to the electronic store application via the application programming interface. A purchase request for a content item that is selected by the user from the content items presented by the electronic store application is processed based on the stored pricing information corresponding to the content item. The purchase request itself is generated by the electronic store application and communicated to the carrier applications client via the application programming interface at the mobile device. A license for the user-selected content item is also sent based on the processed purchase request. A billing account associated with the user in the carrier billing system is charged based on the processed purchase request for the selected content item.

Hence, the exemplary technologies enable a mobile communication application developer to provide mobile device users, using the developer's application, an option to purchase digital content or other items within the application and have the cost of the purchased content billed directly to their respective mobile service accounts (i.e., as opposed to being billed via a separate account associated with the application developer or third-party content-provider). The purchase of items within an application is commonly referred to as an "in-application purchase" or simply "in-app purchase." For example, an application developer or digital content provider can create a software application for a mobile device, which includes a virtual electronic store (or "e-store") embedded directly within the application. The mobile service account for a user or user's mobile device is generally maintained by a wireless carrier or operator of the mobile communication network to which the user subscribes for mobile communication services. In an example, the charges and other transaction details related to the content purchased by a mobile device user via the mobile application on the user's device (i.e., the in-app purchase) appear in a billing or account statement periodically provided to the user by the carrier or operator of the mobile communication network.

Reference now is made in detail to the examples illustrated in the accompanying drawings and discussed below. FIG. 1 illustrates an exemplary system 100 for mobile communications between a mobile device and various application or content servers through a mobile communication network. System 100 includes a mobile computing device 110a and a mobile computing device 110b that are communicatively coupled to an applications store server 130 and a content server 140 through a mobile communication network 120. Application store server 130 is also communicatively coupled, via mobile communication network 120, to a billing system 150 operated by a carrier of mobile communication network 120. In an example, as will be described in further detail below, applications store server 130 is configured to communicate with carrier billing system 150 in order to process purchase requests for in-app items selected by a user at mobile device 110a or mobile device 110b, via an electronic store application executing at the respective mobile device.

Mobile devices 110a and 110b are each coupled to mobile communication network 120 through a wireless network communications interface of the device. Such an interface may include, for example, a wireless network interface controller integrated with the device or implemented in an expansion card attached to the mobile computing device. Further, such an expansion card may be associated with a wireless or mobile communication service provider or carrier.

Mobile devices 110a and 110b can be any type of computing device having one or more processors, a user input (for example, a mouse, QWERTY keyboard, touch-screen, microphone, or a T9 keyboard), and a communications infrastructure capable of receiving and transmitting data over a wireless or mobile communication network of a carrier. For example, mobile device 110a can include, but is not limited to, a mobile phone, a personal digital assistant (PDA), a tablet computer or other similar type of device capable of processing instructions and receiving and transmitting data to and from humans and other computing devices over mobile communication network 120. In an example, mobile device 110b can include, but is not limited to, a laptop or similar type of mobile computer equipped with a wireless network interface controller, as described above, which is provided by the carrier or operator of mobile communication network 120.

Similarly, applications store server 130 and content server 140 each can be any type of computing device having at least one processor, a memory and a communications infrastructure for receiving and transmitting data communication over a mobile communication network. For example, servers 130 and 140 can include, but are not limited to, a computer, a cluster of computers, a set-top box, or other similar type of device capable of processing instructions and receiving and transmitting data to and from mobile devices 110a and 110b over mobile communication network 120. In an example, applications store server 130 is configured to allow a user of mobile device 110a or 110b to select a software application to be downloaded and installed to the device. The software application installed by the user to be executed at the device can be, for example, an e-store application, as described above, which includes various in-app items that may be purchased by the user via an interface provided in the application. In this example, content server 140 is configured to communicate over network 120 with the e-store application while it is executing on the user's device so as to enable the user to complete in-app item purchases with carrier billing via the application.

Further, applications store server 130 may be operated by the carrier or operator of mobile communication network 120 while content server 140 is operated by the developer or content provider associated with the e-store application itself. It should be appreciated that any operations performed by applications store server 130 may occur at a single server operated by the carrier or may be distributed by the carrier across multiple servers that are within the carrier's network. Similarly, the operations performed by content server 140 may occur at a single server of the application developer or content provider or may be distributed across multiple servers as may be necessary.

Mobile communication network 120 can be any network or combination of networks that can carry data communication, and may be referred to herein as a mobile communication or wireless network. Mobile communication network 120 can include multiple interconnected networks including, but not limited to, a wired (e.g., Ethernet) or a wireless (e.g., Wi-Fi or 3G) network. In addition, such interconnected networks can include, but are not limited to, a local area network, medium area network, and/or wide area network such as the Internet. Network 120 can support protocols and technology including, but not limited to, Internet or World Wide Web protocols and communication services. Intermediate network routers, gateways, or servers may be provided between components of communication system 100 depending upon a particular application or environment.

The present techniques may be implemented in any of a variety of available mobile communication networks and/or on any type of mobile device compatible with such a network. In an example, the network 120 can be used to provide mobile wireless communications services to mobile devices 110a and 110b as well as to other mobile devices or mobile stations (not shown), for example, via a number of base stations. In a further example, the wireless mobile communication network 120 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 110a and 110b may are capable of voice telephone communications through the network 120, and for enabling direct carrier billing services for e-store applications, the exemplary devices 110a and 110b are capable of data communications through the particular type of network 120 (and the users thereof typically will have subscribed to data service through the network).

Physical elements of a RAN operated by one of the mobile service providers or carriers include a number of base stations (not shown). Such a base station can include a base transceiver system (BTS), which can communicate via an antennae system at the site of base station and over an air link with one or more of the mobile devices 110a and 110b, when the mobile devices are within certain connectivity range. Each base station can include a BTS coupled to several antennae mounted on a radio tower within a coverage area often referred to as a "cell." The BTS is the part of the radio network that sends and receives RF signals to/from the mobile devices 110a and 110b that are served by the base station.

The radio access networks of mobile communication network 120 can also include a traffic network, which carries the user communications and data for the mobile stations 110a and 110b between the aforementioned base stations and other elements with or through which the mobile stations communicate. The network 120 can also include other elements that support functionality other than device-to-device media transfer services such as messaging service messages and voice communications. Specific elements of the network 120 for carrying the voice and data traffic and for controlling various aspects of the calls or sessions through the network 120 are omitted here form simplicity. It will be understood that the various network elements can communicate with each other and other aspects of the mobile communications network 120 and other networks, including, for example and without limitation, a public switched telephone network (PSTN) and the Internet either directly or indirectly.

As will be described in further detail, such applications developers can utilize a specialized software development kit (SDK), provided by the carrier specifically for enabling in-app purchasing for users of mobile devices 110a and 110b with the option of carrier billing. The carrier provided SDK connects to the carrier's applications store server 130 via a shopping client application, also executed on the mobile devices 110a and 110b. The interaction of the e-store application with the carrier-provided SDK and mobile shopping client enables in-application purchase functionality with automatic carrier billing and associated payment. The carrier is able to collect the payments from the user for the enhanced functionality or additional content purchased when the payments for regular mobile voice and data communications charges (e.g., monthly service charges) are collected.

This is in contrast to many conventional mobile applications, which require the user to a create a separate user account with the application service provider or content distributor in order for the user to initiate any transaction for the delivery of digital content to the user's mobile device via the application. For example, such digital content may be specific to a particular type of mobile communication application and may include, for example and without limitation, electronic books (or "e-books") in a mobile e-bookstore application, movie rentals in a mobile streaming video application, a level in a mobile game, and digital music or ring-tones in a music application. In this example, the digital content is delivered to the mobile application from an associated application server through the mobile communication network 120. However, it should be noted that the present techniques are not limited to application-specific content or to digital content. For example, it may be possible to use these techniques to enable a user to purchase real-world products (e.g., retail electronics), which are presented as items for sale in an electronic store front (or "e-store") application.

Application developers and content providers can sell content and services within their respective applications and still be able to charge the customers through their wireless or mobile service account, as described above. This is made possible by using a single item identifier, or alternatively, a small group of identifiers (e.g., corresponding to different price types associated different billing schemes or pricing models—unlimited vs. monthly vs. temporary or one-time charge), to represent the entire catalog of items associated with a particular application or e-store developer or content provider. The use of a single or small group of identifiers enables the e-store developer to offer new items for in-app purchase to the user without having to continuously provide new or updated catalogs identifying each of the current items for sale on an individual basis. For example, the application developer provides one or more price ranges or price points corresponding to the items available for in-app purchase with the wireless carrier only once (e.g., when the developer initially submits the application to the carrier, such as through an application submission process or interface). This is also a benefit for the carrier or network operator since the amount of information to be tracked for each application developer or content provider is significantly reduced.

Figure 2:
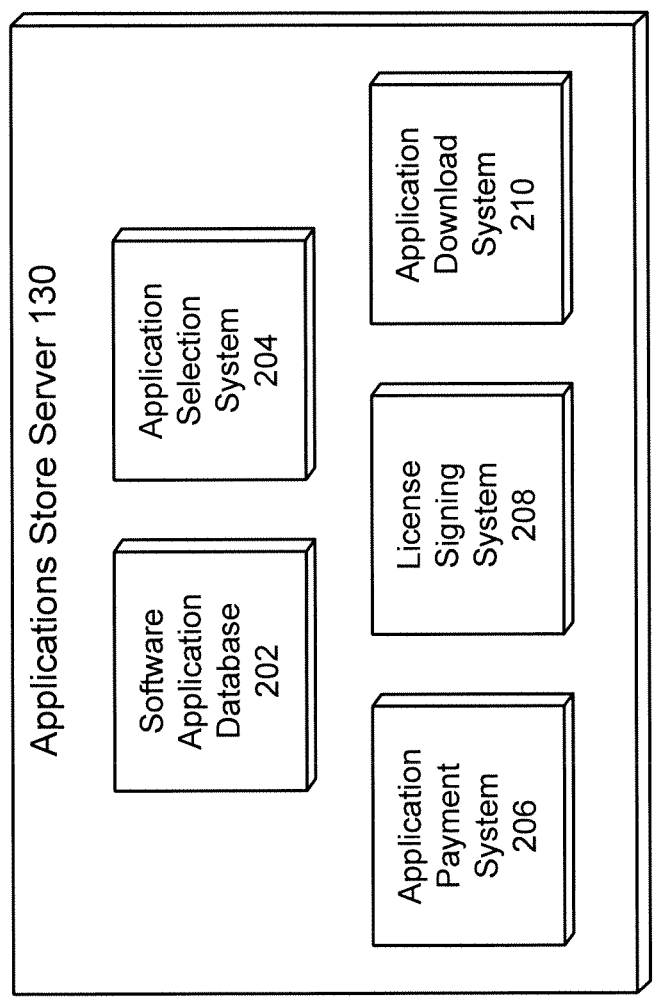
FIG. 2 illustrates an exemplary application store server of a carrier for enabling in-app purchases from e-store applications with carrier billing.

FIG. 2 illustrates an exemplary application store server of a carrier for enabling in-app purchases from e-store applications with carrier billing. As illustrated in FIG. 2, the applications store server 130 may include a software application database 202, an application selection system 204, an application payment system 206, a license signing system 208, and an application download system 210.

The software application database 202 may include a database of software applications. Each software application may be configured to be downloaded, installed, and run in a wireless mobile communication device. The software applications may relate to virtually any user interest or need, such as education, entertainment, finance, health, instant messaging, social networking, maps, navigation, music, news, document generation, photography, shopping, sports, travel, utilities, and/or the weather.

The application selection system 204 may be configured to allow a user to select one of the software applications in the software application database 202 for downloading, installation, and use. The application selection system 204 may provide information that may be used in connection with a user interface to facilitate this selection. The application selection system 204 may be configured to receive the user's selection of one of the software applications in the software application database 202 under the control of an application store client running on the wireless mobile communication device.

The application payment system 206 may be configured to allow the user to purchase a license to use the selected software application. For example, the application payment system 206 may be configured to interface with a carrier billing system, e.g., carrier billing system 340 of FIG. 3, as will be described in further detail below, for processing user purchase requests for in-app items. The application payment system 206 may be configured to allow the user to purchase this license under the control of an application store client running on the wireless mobile communication device. The application payment system 206 may be configured to provide information that may facilitate this payment through a user interface running in the wireless mobile communication device.

The application payment system 206 may be configured to allow the user to select and purchase a license for the selected software application and/or a purchased in-app item. For example, an existing license stored at the user's device for general use of the software application may be replaced by an updated license that is downloaded to the user's device and that enables further use of one or more in-app content items. The in-app purchase history that is stored at the application store server may be used to generate in real-time a license string for enabling the in-app functionality for the application. The license string can then be included along with other licensing information within a license file to be downloaded to the user's device. Such other licensing information may include, for example, the identity of the user, the identity of the selected software application, the payment terms, and the expiration date or next time to check (validate) the license on the application store server for renewing the license. The license may have payment terms that may indicate if it is for a trial version (time based or feature based), partial version, limited feature enabled version, and/or any additional or different functionality that has been purchased with the software application.

The license signing system 208 may be configured to sign the license selected by the user. The signing may be done in a manner that facilitates the authentication of the license. For example, the signing may cause a string that contains the license to be signed using a private key on the application store server. The application store client may have the public key to verify the authenticity of the signature. The software application may also or instead have the public key to permit the signature to be re-verified or verified once it is passed on from the application store client.

The download system 210 may be configured to download the license, after the purchase of the license, along with the selected software application. The license may include information indicative of one or more restrictions on the use of the selected software application by the user, the identity of the user, and the identity of the selected software application. The download system 210 may be configured to download the selected software application and the license to a mobile communication device under the control of an application store client running on the mobile communication device.

Figure 3:
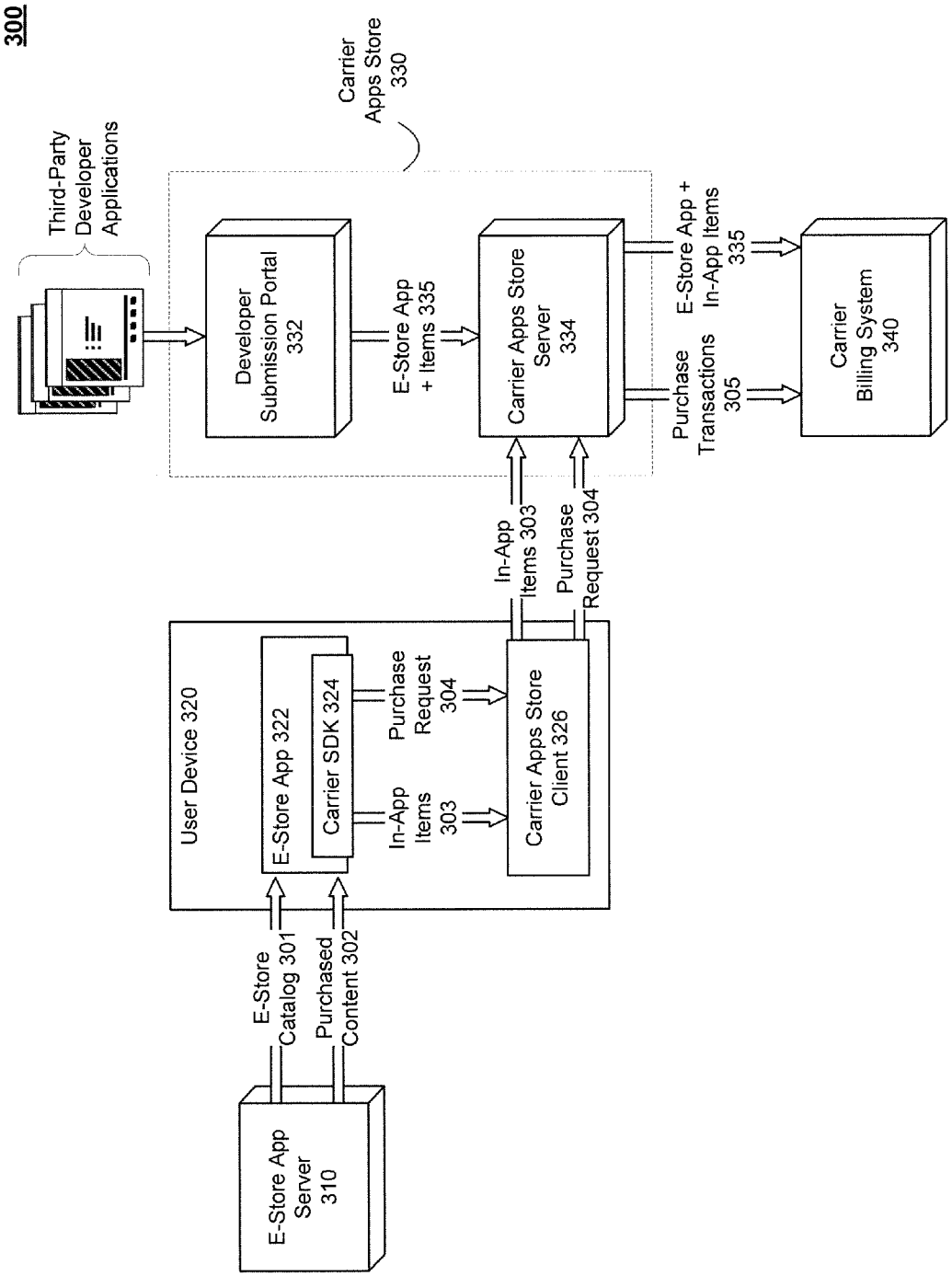
FIG. 3 is a high-level functional block diagram of an exemplary system for enabling direct carrier billing of a user's in-app purchases made within a third-party e-store application on the user's mobile device.

FIG. 3 is a high-level functional block diagram of an exemplary system 300 for enabling direct carrier billing of a user's in-app purchases made within a third-party e-store application on the user's mobile device. For ease of explanation, system 300 is described in the context of system 100 and applications store server 130 of FIGS. 1 and 2, as described above. For example, applications store server 334 of system 300 can be implemented using applications store server 130 and its components, including software application database 202, application selection system 204, application payment system 206, license signing system 208, and application download system 210, as shown in FIG. 2 and described above. However, system 300 is not intended to be limited thereto.

Figure 5:
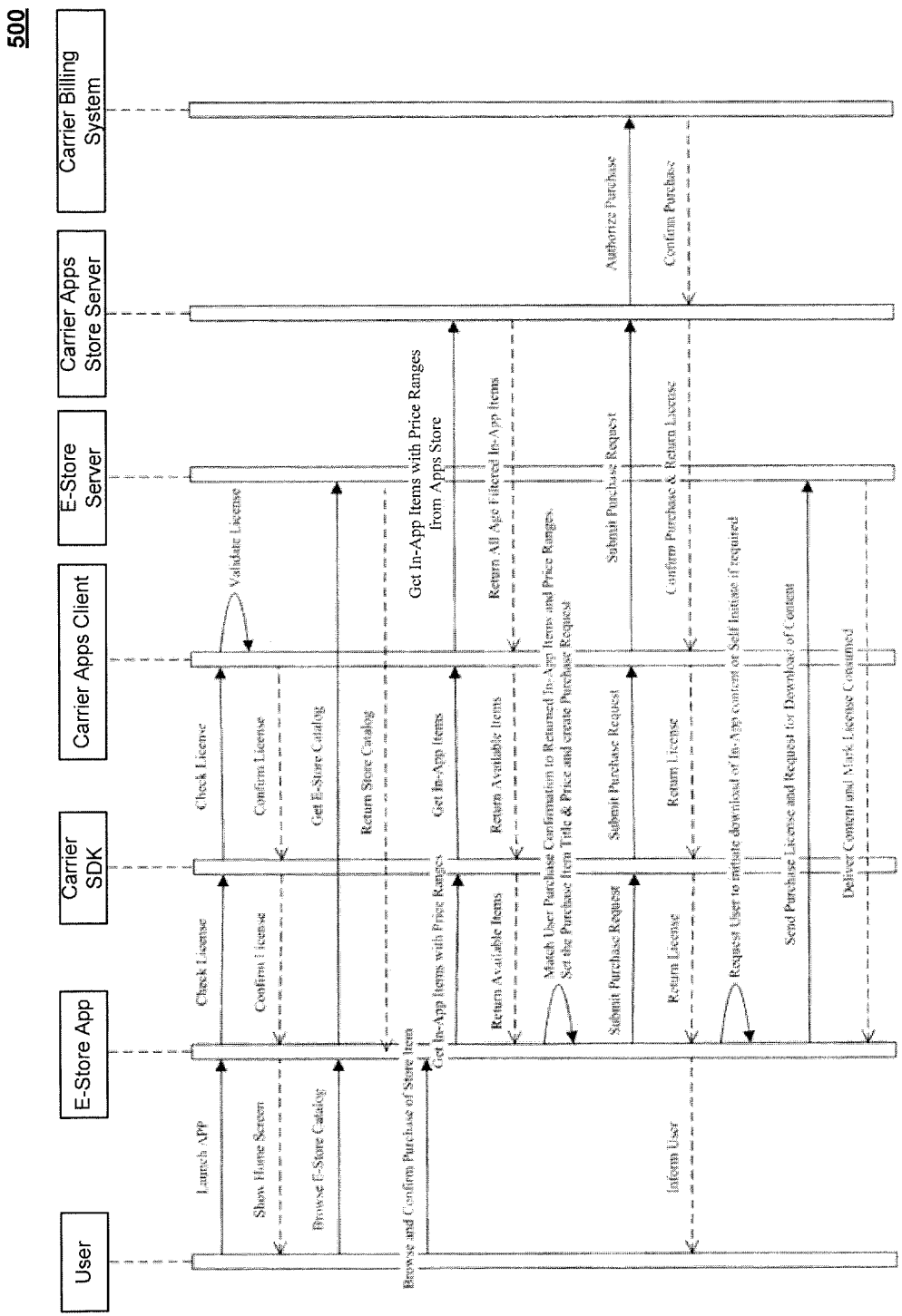
FIG. 5 is a flowchart of an exemplary high-level process for enabling direct carrier billing of a user's in-app purchases made within a third-party e-store application on the user's mobile device.

In the example shown in FIG. 3, system 300 includes an e-store application server 310, a user device 320, a carrier application store 330, and a carrier billing system 340. In an example, application server 310, user device 320 and carrier application store 330 are communicatively coupled to a mobile communication network of a carrier, e.g., mobile communication network 120 of FIG. 1, as described above. As illustrated in FIG. 3, user device 320 includes an e-store application 322, a carrier software development kit (SDK) 324, and a carrier applications (or simply "apps") store client 326. Carrier applications store 330 includes a developer submission portal 332 and a carrier applications store server 334. Additional details regarding the operations performed by the above-listed components and subcomponents of system 300 for enabling the purchase of in-app items with carrier billing will be described below with respect to the exemplary process as shown in FIG. 5.

In an example, third-party application developers or digital content providers submit software applications for various types of mobile device platforms to carrier applications store 330 for distribution to mobile device users or subscribers within the carrier's mobile communication network. For example, the developer may submit different versions of the same application, where each version is implemented to run on a different type of mobile computing platform or operating system supported by the carrier or operator of the mobile communication network. As shown in FIG. 3, such applications are submitted by the developer through developer submission portal 332. For example, submission portal 332 may be a website or other interface made available by the carrier to such application developers and content providers for this purpose. Further, the application developers may be associated with a developer community for application developers and content providers who develop software applications targeting mobile device users associated with the carrier.

The developer submission portal 332 provides an interface that allows developers to submit their respective e-store applications (e.g., as binary executable files) to carrier applications store 330. Furthermore, the submission portal 332 allows developers to register (i.e., with carrier billing system 340 of carrier applications store 330) one or more price points or price ranges associated with in-app content items that a developer wishes to offer for sale to users. As will be described in further detail below, the submitted application binary and associated in-app items 335 that are received at the carrier applications store 330 via submission portal 332 are used by the carrier applications store server 334 to process in-app purchase transactions with carrier billing for the mobile device users or subscribers in the carrier's mobile communication network.

Although system 300 is described in the context of a digital content delivery system for e-store applications, the teachings disclosed herein can be applied to other types of mobile applications for enabling in-app purchasing functionality with carrier billing. Furthermore, although only applications store server 334 is depicted in the example shown in FIG. 3, the functionality of carrier applications store server 334 may be distributed across a plurality of servers that are communicatively coupled to one another in a content management and distribution system or platform operated by the carrier. An example of such a content management platform includes, but is not limited to, the Multimedia Content Manager (MCM) platform from the Acatel-Lucent corporation of Paris, France. Similarly, although submission portal 332 and carrier billing system 340 are shown as a single component in system 300, it is noted that any number of system components may be implemented as necessary by the carrier in the mobile communication network for enabling the techniques as disclosed herein. Such other components and subcomponents have been excluded from this description for ease of explanation and purposes of description.

The mobile applications submitted to portal 332 include, for example and without limitation, e-store application 322. In an example, the carrier provides one or more application programming interfaces (APIs) to the application developer for developing applications, such as e-store application 322, which allow the mobile device users/subscribers of mobile communication services in the carrier's mobile communication network to make an in-app item purchase with the option of carrier-billing as opposed to the application developer or content provider. For example, the mobile communication application of the developer, via carrier SDK 324, communicates locally with the carrier-provided application client to submit purchase requests and receive information related to each request, including information for enabling the carrier billing functionality (e.g., from the carrier's app store server and billing system) and the actual content purchased (e.g., from the application content or e-store server). For example, carrier provided SDK 324 may be an integrated component of e-store application 322 at user device 320 and accessible to e-store application 322 via a carrier provided API, as described above.

In this example, e-store application 322 is an application client adapted to communicate with e-store application server 310 for requesting digital content or services associated with an e-store application provided by the application developer or content provider. E-store application server 310 in this example is an application server associated with the e-store application 322. E-store application server 310 may be operated by, for example, the third-party application developer or content provider that submitted the application and in-app item information via developer submission portal 332 of carrier applications store 330. As shown in FIG. 3, e-store application server 310 sends e-store application 322 an e-store catalog 301 in response to a request from e-store application 322 over a mobile communication network (e.g., network 120 of FIG. 1, as described above). E-store catalog 301 may be, for example, a virtual catalog or storefront having various in-app items for purchase by the user from within e-store application 322. The user at device 320 can use the e-store catalog 301, e.g., via a graphical interface provided in e-store application 322, to browse and select an in-app for purchase. The purchased content 302 is provided by e-store application server 310 and installed to user device 320. To enable carrier billing for the purchased content, the in-app items 303 purchased from e-store application 322 are sent through carrier SDK 324 to the carrier applications store client 326.

Figure 4:
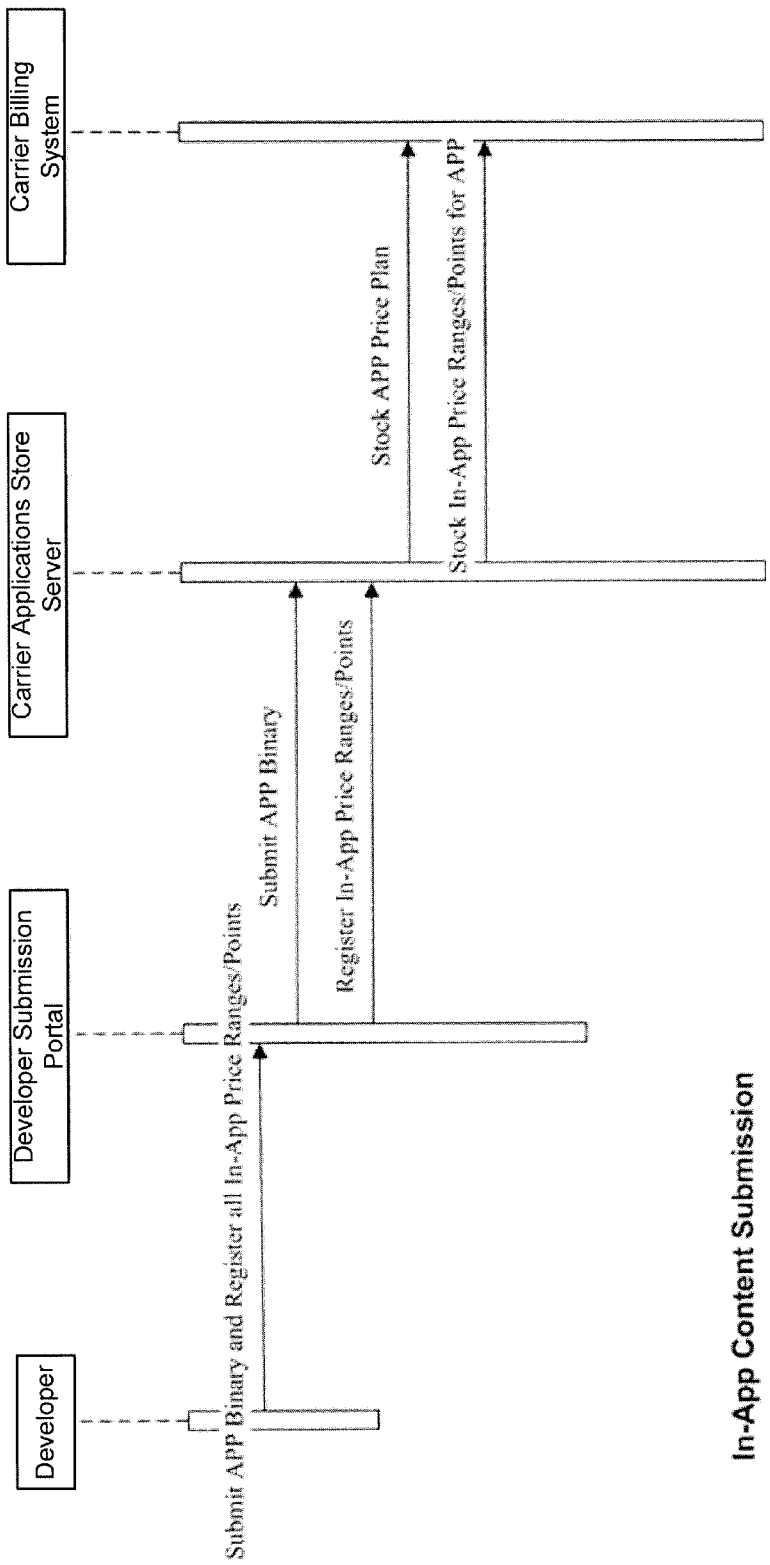
FIG. 4 is a flowchart of an exemplary process for a third-party application developer to submit an e-store application and associated in-app content so as to enable direct carrier billing of a user's in-app purchases made within the developer's e-store application.

In operation, the carrier-provided SDK 324 in this example enables the developer's e-store application 322 to request pricing information for the in-app items 303, which was previously registered for the application at carrier billing system 340 during the application and in-app content submission process (e.g., as shown in FIG. 4, as will be described below). Additionally, carrier SDK 324 enables e-store application 322 to send a purchase request 304 to carrier applications store server 324 via the carrier's store or shopping client application 326. For example, carrier apps store client 326 may be executing at device 320 in parallel with or as a background process for e-store application 322 and carrier SDK 324. Further, the carrier-provided SDK 324 enables information associated with the purchase (e.g., name of the purchased item) to be dynamically generated (e.g., at the time the particular in-app item is purchased via e-store application 322) for purposes of registering the purchase with the carrier's system (i.e., the carrier apps store 330 and carrier billing system 340). This enables transaction details corresponding to purchased items to appear on the user's account or billing statement provided by the carrier. For example, transaction information and payment details for the purchased in-app items may be included with regular account charges in the user's next monthly billing statement.

The e-store application 322 submitted by the developer in this example may be one of a plurality of various software applications, including those from different third-party application developers or content providers. The applications are provided by the carrier to its mobile device users or subscribers through an interface of carrier applications store 330. For example, carrier applications store 330, via carrier applications store server 334, provides a virtual storefront or "applications store," as described previously, which includes the different applications. In an example, the interface is implemented using the carrier's applications store client 326 installed on a user's mobile device 320, as shown in FIG. 3. Like the applications submitted by developers to carrier applications store 330, carrier applications store client 326, in this example, is also a kind of e-store application for an electronic or virtual storefront of applications, as noted above. Also like the developer-submitted applications, carrier applications store client 326 may be adapted to operate on various types of mobile devices and platforms that are supported by the carrier.

As shown in FIG. 3, carrier applications store client 326 is one of various software or client applications (e.g., including e-store application 322) installed on user device 320. For example, carrier applications store client 326 may be preinstalled onto user device 320 by the carrier and thus available for use when the device is first purchased by the user. Alternatively, carrier applications store client 326 may be available through a separate applications shopping client that may be provided, for example, by the device manufacturer or other entity that provides and maintains the operating system and application development platform of user device 320. In this example, carrier applications store client 326 is adapted to communicate with carrier applications store server 334 over a mobile communication network operated by the carrier (e.g., mobile communication network 120 of system 100, as shown in FIG. 1 and described above).

In an example, carrier applications store client 326 acts as an on-device portal (ODP) for carrier applications store 330. For example, carrier applications store server 334 may provide an online or virtual catalog of available applications via the ODP of carrier applications store client 326. Hence, carrier applications store client 326 enables the user of device 320 to browse and select one or more applications for download and installation to the device 320. Also, as will be described in further detail below with respect to FIG. 5, carrier applications store client 326 further enables the user of device 320 to complete in-app item purchase transactions with the option of carrier billing.

Reference is now made to FIG. 4 for describing an exemplary process of a third-party application developer for submitting an e-store application (e.g., e-store application 322 of FIG. 3) and its associated in-app content purchase items to the carrier's applications store (e.g., carrier applications store 330 of FIG. 3). For example, this application and in-app content submission process may be an initial step for enabling direct carrier billing of a user's in-app purchases made within the developer's e-store application.

As shown in FIG. 4, in addition to submitting the application binary file via a developer submission portal provided by the carrier (e.g., developer submission portal 332 of FIG. 3, as described above), the developer also submits information corresponding to all of the in-app item(s) associated with the application. Such information includes, for example and without limitation, a name or identifier and a price range representing all of the in-app items that are available for purchase within the application. In an example, the developer designates a general name or identifier for the in-app item(s) in addition to a price range including minimum and maximum values corresponding to the prices of the in-app items that are available for purchase within the application.

In a further example, the developer designates a different name and price range combination for the same set of in-app purchase items based on different pricing schemes or models. For example, such pricing schemes may vary across different application developers or content providers based on a developer's pricing needs or business model. Different pricing models that may be offered by a developer for various in-app purchase items include, for example and without limitation, one-time purchases, time-limited purchases for which a particular functionality can be used for only a limited period of time (e.g., for accessing a particular service offered by the application/service provider), and recurring subscription-based purchases (e.g., for a monthly subscription service to access various forms of digital content).

As shown in FIG. 4 and also in FIG. 3 at data flow 335 of system 300, the information received via developer submission portal 332, including name/identifier and price point/range information, corresponding to the in-app purchase items for the developer's e-store application 322 are registered with the carrier billing system 340 of carrier applications store 330. In an example, carrier billing system 340 maintains a catalog of registered price ranges for in-app items associated with e-store application 322. Referring back to FIG. 3 in particular, although not shown in the simplified block diagram for system 300, carrier billing system 340 may be implemented using additional components including, for example, one or more data stores or databases for storing data records or files corresponding to the in-app purchase items associated with a particular e-store application.

The pricing information submitted to carrier applications store 330 represents all in-app purchase items for e-store application 322, including any future in-app items that currently have not been implemented. Therefore, any changes in content or pricing for the previously registered application binary and in-app items do not require the application developer to provide corresponding updates to carrier applications store 330, including carrier billing system 340. As such, the developer or content provider can continue expanding the number of in-app items offered through the e-store application 322 without being limited by the information previously submitted to the carrier.

The above-described capability is in contrast to conventional techniques in which the developer is required to notify the carrier to update its catalog of in-app purchase items and respective pricing data any time there was a change or addition to the set of in-app items offered in the e-store application. Furthermore, this capability allows the developer or content provider of e-store application 322 to register merely a small amount of pricing information for the in-app purchase items within e-store application 322. For example, the developer of e-store application 322 needs to include only one or a relatively small number of price points or ranges when initially submitting the developer's application to carrier applications store 330 (e.g., through the developer submission portal 332 of the store), without having to update this pricing information for any new in-app purchase items that may be added to e-store application 322 at a later time.

FIG. 5 illustrates an exemplary high-level data flow of a process 500 for enabling in-app item purchases with direct carrier billing for an e-store application on a mobile device of a user. For ease of explanation, process 500 will be described in the context of system 300 of FIG. 3, as described above. However, process 500 is not intended to be limited thereto. For example, the mobile device of the user in this example may be implemented using user device 320 in system 300 of FIG. 3, as described above. As such, the e-store application in this example may be implemented using, for example, e-store application 322 of user device 320.

As described above, the application developer submits the e-store application to a developer submission portal (e.g., developer submission portal 332 of system 300) of a carrier applications store (e.g., carrier applications store 330) using, for example, process 400 of FIG. 4. Hence, it will be assumed for purposes of description that the e-store application in process 500, including the associated in-app items available for purchase, were previously submitted and registered with the carrier's e-store applications store and billing system such a submission process. Further, it will be assumed that this e-store application was previously downloaded and installed to the mobile device by the user. For example, the application may have been installed via a carrier applications store or shopping client (e.g., carrier applications store client 326 of system 300), which is also installed and executable on the device, as described above.

Accordingly, process 500 begins when the user launches the e-store application for execution on the user's device. Upon launch, the e-store application makes a request to validate its current license for use on the device in the mobile communication network. The validation request is sent to the e-store applications store server via the carrier SDK and carrier applications store client, as described above. Upon successful license validation, the e-store application connects to the e-store server of the application developer to request a catalog or listing of items that can be purchased using the application. For example, the e-store catalog provided by the e-store server may include an image, a brief description, and pricing information for each item available for purchase via the e-store application. Further, the prices for each item as displayed in the e-store application generally would be within at least one of the price ranges previously registered with carrier applications store, as described above.

Next, the user browses and selects an in-app item for purchase via, for example, a graphical user interface of the e-store application as presented on a display screen of the user's device. Once the user has confirmed the purchase, the e-store application connects to a carrier applications store server (i.e., via the carrier SDK and applications store client on the device) for requesting information related to the in-app items and associated price ranges. As described above, the in-app items with one or more price ranges were previously registered by the application developer with the carrier applications store for the particular e-store application during the initial application submission process. The information requested from the carrier applications store server may include, for example and without limitation, one or more unique item identifiers, which are assigned to the e-store application by the carrier applications store (e.g., upon submission of the application to the developer submission portal). For example, the unique identifier(s) may be stored at the carrier applications store and carrier billing system in association with the registered price range(s) corresponding to the available in-app items for the e-store application. Further, multiple identifiers may be stored for the e-store application, where each identifier corresponds to a different pricing model (e.g., one-time use, use for a limited period of time, etc., as previously described), as designated by the application developer or content provider.

The e-store application matches the confirmed user purchase with the list of available in-app items and price ranges that are returned for the application from the carrier applications store server. Once the in-app item purchase as confirmed by the user has been successfully matched with the registered information returned from the carrier applications store server, the e-store application in conjunction with the carrier SDK generates a purchase request based on a price range returned from the carrier's server (i.e., one set of price ranges if multiple sets of price ranges are returned). The generated purchase request may include, for example and without limitation, the name of the item being purchases, the exact price of the item, and any additional item-specific inventory information, such as a stock-keeping unit (SKU) number. For example, the SKU number may be used to uniquely identify the item in the e-store catalog for the application. In an example, the carrier SDK builds the name of purchased item dynamically when the purchase request is generated so that the details of the purchased items will appear on the carrier bill that will be sent to the user for requesting payment.

As shown in FIG. 5, the carrier applications store client submits the purchase request from the e-store application and carrier SDK to the carrier applications store server. Once the carrier store server has confirmed the purchase request, it returns a new license including details for the purchased items to the e-store application (i.e., via the carrier applications store client). Examples of the details for the purchased items in the new license may include, but are not limited to, purchaser identification, purchased price, name of the purchasing application, the purchase type (e.g., corresponding to a pricing mode, as previously described) and a purchase expiration date, if applicable.

Once the new license has been acquired, the e-store application can communicate with the e-store server of the application provider or content provider to download the purchased content onto the user device. The e-store server then delivers the content to the device and marks the license as having been consumed or used for its intended purpose. Further, the carrier (e.g., via the carrier billing system) bills the mobile device user/subscriber and settles the account revenue with application developer/content provider of the e-store based on, for example, a contract associated with sale of the in-app items purchased by the user/subscriber via the developer's e-store application.

Figure 6:
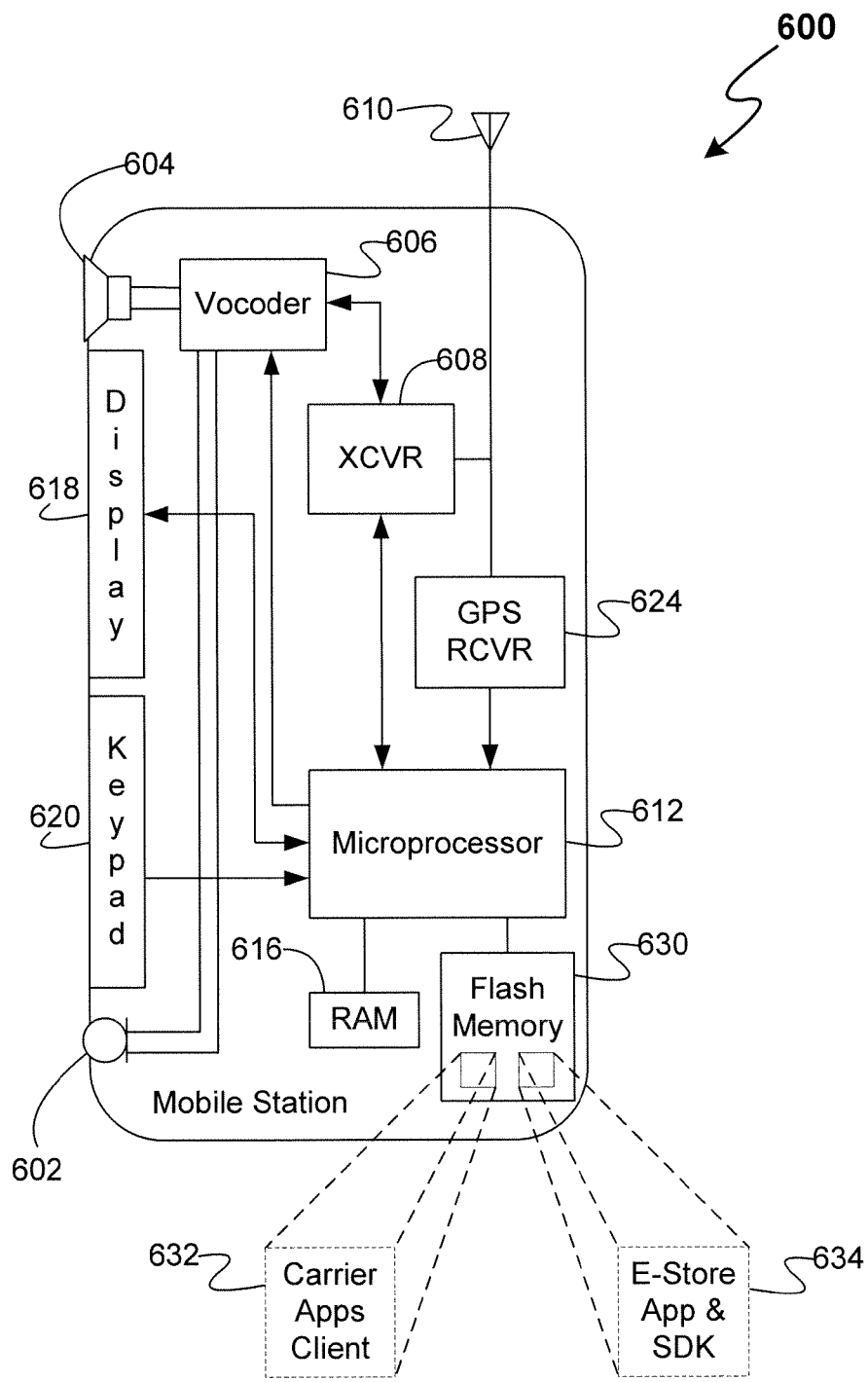
FIG. 6 is a high-level functional block diagram of an exemplary mobile device for enabling direct carrier billing of a user's in-app purchases made within a third-party e-store application executed at the device.

FIG. 6 is a high-level functional block diagram of an exemplary mobile device 600 for enabling direct carrier billing of a user's in-app purchases made within a third-party e-store application executed at the device. For example, mobile device 110a of system 100, as described above, may be implemented using mobile device 600.

As illustrated in the example of FIG. 6, mobile device 600 includes a microphone 602, a speaker 604 and a voice encoder ("vocoder") 606, for audio input and output functions, much like in the earlier example. The mobile device 600 also includes at least one digital transceiver (XCVR) 608 for digital wireless communications, although device 600 may include an additional digital or analog transceiver. The concepts discussed here encompass embodiments of the mobile device 600 utilizing any digital transceivers that conform to current or future developed digital wireless communication standards.

The transceiver 608 provides two-way wireless communication of information, such as encoded speech samples and/or digital information, in accordance with the technology of a particular mobile communication network (e.g., network 120 of system 100, as shown in FIG. 1 and described above). The transceiver 608 also sends and receives a variety of signaling messages in support of the various voice and data services provided via the mobile device 600 and the communication network. Although not shown, transceiver 608 may connect to one or more RF amplifiers for sending and receiving communication signals via antenna 610. Transceiver 608 may also support various types of mobile messaging services including, but not limited to, short message service (SMS), enhanced messaging service (EMS) and/or multimedia messaging service (MMS).

In an example, mobile device 600 also includes a global positioning system (GPS) receiver 624 for receiving GPS signals so as to provide a user of the mobile device 600 with a global navigation and positioning tool. A GPS enabled mobile device (e.g., a mobile device including the GPS component 624 and its associated application software) informs the user of exact positioning information of the mobile device and may support various location-based services. Examples of such location-based services include, but are not limited to, location-based notifications and maps with driving directions.

As shown in FIG. 6, mobile device 600 further includes a microprocessor 612, which serves as a programmable controller for the device. For example, microprocessor 612 may be used to control all operations of mobile device 600 in accordance with programmed instructions that it executes. Such operations may include operations for general device functions, and operations for enabling in-app item purchases with carrier billing for an e-store application (and carrier SDK and carrier applications store client), as described above with respect to FIGS. 1-5. For example, the instructions executed by microprocessor 612 may include functions corresponding to the steps in process 500 of FIG. 5 that are performed at the user device, as described above.

Also, as shown in the example of FIG. 6, the mobile device 600 includes flash type program memory 630, for storage of various program routines and mobile configuration settings. In an example, programming stored in the flash memory 630 configures processor 612 such that the mobile device 600 is capable of performing various functions as desired. For purposes of this discussion, the programming in memory 630 includes carrier applications client 632 (e.g., carrier applications store client 326 of FIG. 3) and e-store application with carrier SDK 634 (e.g., e-store application 322 and carrier SDK 324 of FIG. 3) to implement the functions involved in the techniques for providing the functionality for in-app item purchasing with carrier billing, as described above. The stored e-store application 634 may further include the associated license files, as described above. In this example, the mobile device 600 also includes a non-volatile random access memory (RAM) 616 for a working data processing memory. Of course, other storage devices or configurations may be added to or substituted for those in the example.

In the example of FIG. 6, the user interface elements of mobile device 600 include a display 618 and a keypad 620. For example, keypad 620 may include a limited number of hardware keys, and many of the user interface functions may be provided through a touch-screen interface of display 618. At a high level, a touch-screen of display 618 is configured to display information to a user and to detect the occurrence and screen position associated with user input (i.e., the user's finger touching an area on the display). Such user input may be an actual touch of the display device with a finger, stylus or other object. Further, display 618 may include a touch-screen that can also sense when the object is in close proximity to the screen. Use of a touch-screen display as part of the user interface enables a user to interact directly with the information presented on the display.

Based on the foregoing, the exemplary mobile device 600 uses display 618 to present visible outputs to the device user. Although not shown in FIG. 6, mobile device 600 may also include a touch/position sensor and/or sense circuit for detecting signals related to the occurrence and position of each user input (e.g., touch) via display 618. For example, such a sensor or sense circuit provides touch position information to the microprocessor 612, which can correlate that information to the information currently displayed via the display 618, so as to determine the nature of user input via the screen.

The display 618, including any touch sensors, and possibly one or more hardware keys or buttons, are the physical elements providing the textual and graphical user interface for mobile device 600. In addition, a microphone 602 and speaker 604 may be used as additional user interface elements, for audio input and output, including with respect to any e-store application related functions.

The structure and operation of the mobile device 600, as outlined above, were described to by way of example, only. In an example, e-store application, including carrier SDK, 634 and carrier applications client 632 operate as client applications in a client-server network environment. Accordingly, mobile device 600 operates as a client terminal and a remote computer as a server in the client-server network environment. For example, in-app purchasing functions provided by e-store application (and carrier SDK) 634 along with carrier applications client 632 can be implemented through communication with an associated application on a remote computer (or server) operated by a carrier (e.g., carrier applications store server 130 of system 100, shown in FIG. 1) in a mobile communication network (e.g., network 120 of system 100). In an example, mobile device 600 sends information relating to a particular in-app item, selected by a user via an interface of in e-store application and carrier SDK 634, to the carrier's remote server. In this example, e-store application 634 uses carrier SDK to send a request including the information over the mobile communication network to the carrier's remote server via carrier applications client 632, as described above. The carrier's remote server processes the information and returns to e-store application 634, for example, in-app item identification and pricing information associated with the purchased in-app item to mobile device 600, via carrier applications client 632, over the network.

As shown by the above discussion, server-side functions relating to in-app purchases with carrier billing for an e-store application, via a graphical user interface of a mobile station may be implemented on computers connected for data communication via the components of a packet data network. Although special purpose devices may be used, such devices also may be implemented using one or more hardware platforms intended to represent a general class of data processing device commonly used to run "server" programming so as to implement the in-app purchase functionality for e-stores as described above (e.g., with an appropriate network connection for data communication).

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming including executable code as well as associated stored data, e.g., files used for the e-store application, application licenses, carrier SDK, and carrier applications store client. The software code is executable by the general-purpose computer that functions as the e-store application server, the carrier applications store server and/or that functions as an e-store application or carrier applications store client on a mobile device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for in-app purchases with carrier billing for e-store applications in essentially the manner performed in the implementations discussed and illustrated herein.

Figure 7:
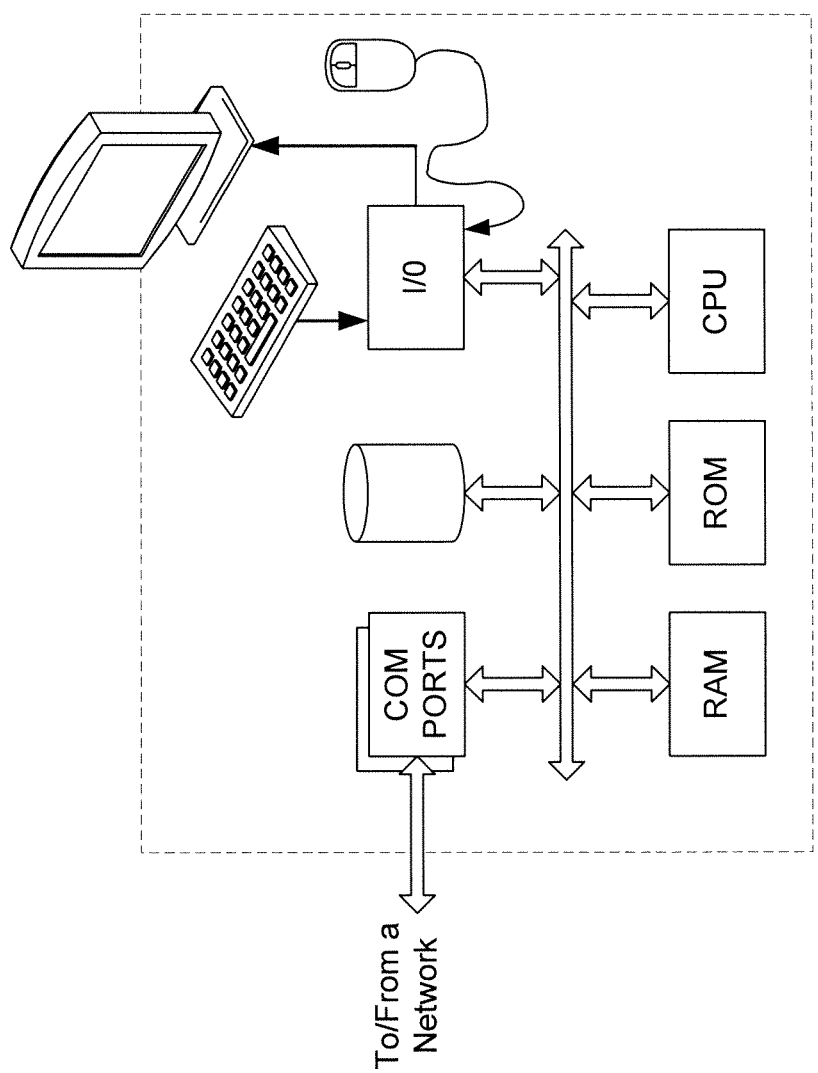
FIG. 7 is a block diagram of an example computer system in which functions for enabling in-app purchases from e-store applications with carrier billing may be implemented.

FIG. 7 is a block diagram of an example computer system in which functions for enabling in-app purchases from e-store applications with carrier billing may be implemented. The example computer system as shown in FIG. 7 is intended to provide a functional block diagram of a general purpose computer hardware platform. In an example, the general purpose computer of FIG. 7 may be used to implement a tablet, netbook, notebook computer or the like. For example, the example computer system of FIG. 7 may be used to implement mobile device 110*b* of system 100, as shown in FIG. 1 and described above.

Aspects of the in-app purchasing functions of the e-store application and carrier applications store client, as described above, may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the mobile device, processors or the like, or associated modules thereof, such as various semiconductor memories, tape drives, disk drives and the like, which may provide non-transitory storage at any time for the software programming. All or portions of the software may at times be communicated through the Internet or various other networks. Such communications, for example, may enable loading of the software from one computer or processor into another, for example, from a remote server computer of a network into a mobile device or the like as illustrated herein. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the in-app purchasing with carrier billing functionality, as shown in the drawings and described above. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves, such as those generated during radio frequency (RF) and infrared (IR) data communications. Common forms of computer-readable media therefore include, for example, a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising steps of:

receiving, at a computerized billing system running on a server operated by a carrier of a mobile communication network, digital pricing information, provided by a third-party provider separate from the billing system, for application programs associated with an electronic store application program, of the third-party provider, installed on a mobile device, wherein a digital description of each application program is to be presented to a user of the mobile device for purchase via a user interface provided by the electronic store application program executing at the mobile device;

in response to receiving the digital pricing information, registering the digital descriptions of the application programs, by the billing system, and associating the digital pricing information with the digital descriptions of the registered application programs;

receiving by the server, a request initiated by the electronic store application program executing at the mobile device, the request being transmitted to the server via a carrier applications store client program installed on the mobile device and executing at the mobile device, the request having been initiated by the electronic store application program based on input from the user via the user interface wherein the electronic store application program is configured to communicate with the carrier application store client program via an application programming interface between the electronic store application program and the carrier applications store client program running at the mobile device, and the carrier applications store client program being configured to communicate the digital pricing information from the carrier billing system to the electronic store application program via the application programming interface;

sending, by the server to the mobile device via the mobile communication network, the stored digital pricing information for at least some of the application programs in response to the request;

processing by the server a first purchase request, received from the carrier applications store client program through the mobile communication network, for first uses of an identified application program based on the digital pricing information associated with the identified application program, the first uses of the identified application program having been selected by the user from among the application programs presented by the electronic store application program via the user interface of the electronic store application program, and the first purchase request being generated by the electronic store application program running at the mobile device and communicated to the carrier applications store client program via the application programming interface running at the mobile device;

sending by the server a first digital license associated with the first uses of the identified application program for the electronic store application program based on the processed first purchase request through the mobile communication network to the mobile device, the first digital license enabling the user to obtain the identified application program directly from the third-party provider the first digital license interacting with the identified application program on the mobile device to provide the first uses of the identified application program;

charging a billing account associated with the user in the carrier billing system based on the processed first purchase request for the first uses of the identified application program;

processing, by the server, a second purchase request received from the carrier applications store client program through the mobile communication network for second uses of the identified application program, different from the first uses;

sending, by the server, a second digital license associated with the identified application program to the mobile device, the second digital license interacting with the identified application program on the mobile device to provide the second uses of the identified application program;

charging the billing account associated with the user in the carrier billing system based on the processed second purchase request; and responsive to a request from a user providing, on the mobile device, the second uses of the identified application program.

2. The method of claim 1, wherein the electronic store application program and the associated digital pricing information for the application programs were previously submitted by the third-party provider to the carrier via a developer submission portal to the computerized billing system running on the server of the carrier.

3. The method of claim 1, wherein the digital pricing information includes a plurality of price ranges for the application programs associated with the electronic store application program based on pricing models specified by the third-party provider, each pricing model representing a type of permissible use of each application program associated with the electronic store application program running at the mobile device of the user wherein the pricing models specified by the third-party provider include respective prices for a one-time use model, a time-restricted use model, a subscription-based pricing use model, and an unlimited use model.

4. The method of claim 3, wherein the purchase request for the identified application program includes a price range selected from the plurality of price ranges, a price for the identified application program, and a unique identifier for the identified application program associated with the electronic store application program.

5. The method of claim 4, wherein the purchase request further includes a name of the identified application program that is dynamically generated by the electronic store application program using the application programming interface of the carrier applications store client program running at the mobile device in response to the user's selection of the application program for purchase via the user interface of the electronic store application program running at the mobile device.

6. The method of claim 1 further including signing, by the server, the first and second digital licenses before sending the first and second digital licenses to the mobile device, wherein the identified application program is configured to verify the first and second digital licenses before providing the respective first and second uses.

7. An application server, comprising:
a network communication device configured to exchange data communications through a mobile communication network, the mobile communication network including at least one database accessible to the network communication device;
a processor coupled to the network communication device;
a storage device accessible to the processor; and
a carrier application program in the storage device, the carrier application program including a plurality of functions, and execution of the carrier application program by the processor configuring the application server to exchange data communications related to the plurality of functions with an associated carrier applications store client program, installed in and running at a mobile device, through the mobile communication network, wherein the processor is configured by the carrier application program to perform functions, including functions to:

receive, at the database in the mobile communication network, digital pricing information, provided by a third-party provider, separate from the application server, for application programs associated with an electronic store application program of the third-party provider, the electronic store application program being installed in and running at the mobile device, wherein a digital description of each application program is to be presented to a user of a mobile device for purchase via a user interface provided by the electronic store application program executing at the mobile device;

in response to receiving the digital pricing information, register the application programs and associate the received digital pricing information with the registered application programs;

receive a request from the carrier applications store client program installed in and executing at the mobile device for the stored pricing information for at least a plurality of application programs;

transmit, to the mobile device via the mobile communication network, the stored pricing information for at least the plurality of the application programs in response to the request;

process, at the application server, a first purchase request, received from the carrier applications store client program, running on the mobile device, through the mobile communication network, for first uses of an identified application program of the plurality of application programs based on the digital pricing information associated with the identified application program, the identified application program having been selected by the user from among the application programs presented to the user by the electronic store application program via the user interface of the electronic store application program, and the first purchase request being generated by the electronic store application program running at the mobile device and communicated to the carrier applications store client program via an application programming interface between the electronic store application program and the carrier store client program running at the mobile device;

send a first digital license associated with the first uses of the identified application program via the electronic store application program based on the processed first purchase request through the mobile communication network to the mobile device, the first digital license enabling the user to obtain the identified application program directly from the third-party provider the first digital license interacting with the identified application program on the mobile device to provide the first uses of the identified application program;

record in a billing system operated by a carrier of the mobile communication network a digital charge to a billing account associated with the user in the carrier billing system based on the processed first purchase request for the first uses of the identified application program;

process a second purchase request received from the carrier applications store client program through the mobile communication network for second uses of the identified application program, different from the first uses;

send a second digital license associated with the identified application program to the mobile device, the second digital license interacting with the identified application program on the mobile device to provide the second uses of the identified application program; and record in a billing system operated by a carrier of the mobile communication network a digital charge to a billing account associated with the user in the carrier billing system based on the processed second purchase request for the second uses of the identified application program;

wherein the mobile device, in response to a request from a user, provides the second uses of the identified application program.

8. The system of claim 7, wherein the pricing information includes a plurality of price ranges for each of the application programs associated with the electronic store application program based on pricing models specified by the third-party provider, each pricing model representing a type of permissible use of each of the application programs associated with the electronic store application running at the mobile device of the user, wherein the pricing models specified by the third-party provider include respective prices for a one-time use model, a time-restricted use model, a subscription-based pricing use model, and an unlimited use model.

9. The system of claim 8, wherein the purchase request for the identified application program includes a price range selected from the plurality of price ranges, a price for the identified application program, and a unique identifier for the identified application program in the electronic store application.

10. The system of claim 9, wherein the purchase request further includes a name of the identified application program that is dynamically generated by the electronic store application program using the application programming interface running at the mobile device in response to the user's selection of the application program for purchase via the user interface of the electronic store application program running at the mobile device.

11. The application server of claim 7, wherein the processor is further configured by the carrier store application to perform the function of signing the first and second digital licenses before sending the first and second digital licenses to the mobile device, wherein the identified application program is configured to verify the first and second digital licenses before providing the respective first and second uses.

12. A method, comprising steps of:
sending, by a computing device, through a mobile communication network to an applications store server operated by a carrier of the mobile communication network, a request for digital pricing information for application programs registered with the applications store server and associated with an electronic store application program of a third-party provider, wherein:
the third-party provider is separate from the applications store server and separate from the computing device;
the electronic store application program runs on the computing device,
the request is initiated by the electronic store application program based on input from a user via a user interface provided by the electronic store application program,
the user interface of the electronic store application program presents a digital description of each of the application programs to the user via a display of the computing device, and
the electronic store application uses an application programming interface between the electronic store application program and a carrier application store client program provided by the carrier and running on the computing device to initiate the request for the digital pricing information;

upon receipt, by the carrier application store client program, running on the computing device, of a first response including the digital pricing information for the application programs from the carrier applications store server, sending the digital pricing information received from the carrier applications store server to the electronic store application program via the carrier application store client program and the application programming interface running at the computing device;

sending by the electronic store application program running on the computing device, through the mobile communication network to the carrier applications store server, a first purchase request for first uses of an identified application program based on the pricing information associated with the identified application program, the identified application program having been selected by the user from the application programs presented via the user interface of the electronic store application, and the first purchase request being generated by the electronic store application program and received by the carrier application store client program from the electronic store application program via the application programming interface;

upon receipt, by the carrier application store client program running on the computing device, of a second response including a first license for the first uses of the identified application program from the carrier applications store server, communicating the first license for the first uses of the identified application program to the electronic store application program via the application programming interface;

sending, by the computing device, a copy of the first license for the identified application program to an electronic store server, separate from the carrier applications store server; and receiving, by the computing device, the identified application program directly from the electronic store server in response to sending the first license from the carrier application store client program to the electronic store application program via the application program interface, the requested application program interacting with the first license to provide the first uses of the identified application program on the computing device;

sending, by the electronic store application program running on the computing device, a second purchase request to the carrier applications store server, the second purchase request being for second uses of the identified application program based on the pricing information associated with the identified application program, the second purchase request being generated by the electronic store application program and received by the carrier application store client program from the electronic store application program via the application programming interface;

upon receipt, by the carrier application store client running on the computing device, of a third response including a second license for the second uses of the identified application program from the carrier applications store server, sending the second license for the second uses of the identified application program to the electronic store application program via the application programming interface;

wherein the identified application program, running on the computing device, interacts with the second license to provide the second uses of the identified application program on the computing device in response to a request from a user.

13. The method of claim 12 further including authenticating, by the carrier store applications client, the first and second digital licenses upon receipt of the first and second licenses from the carrier applications store server.

14. An article of manufacture, comprising a non-transitory computer-readable medium and computer-executable instructions embodied in the medium that, if executed by a computing device, cause the computing device to perform functions including functions to:

send through a mobile communication network to an applications store server operated by a carrier of the mobile communication network, a request for digital pricing information for application programs registered with the applications store server, the application programs being associated with an electronic store application program of a third-party provider executing at the computing device, the third party provider being separate from the applications store server and separate from the computing device wherein:

the request is initiated by the electronic store application program based on input from a user at the computing device via a user interface provided by the electronic store application program, the user interface of the electronic store application program presents each content item to the user via a display of the computing device, and the electronic store application uses an application programming interface between the electronic store application and a carrier application store client program provided by the carrier and running at the computing device to initiate the request for the digital pricing information;

upon receipt by the carrier application store client program of a first response including the digital pricing information for the application programs from the carrier applications store server, send the digital pricing information received from the carrier applications store server from the carrier application store client program to the electronic store application program via the carrier application store client program and the application programming interface running at the computing device;

send by the electronic store application program, via the application program interface and the carrier application store client program, through the mobile communication network to the carrier applications store server, a first purchase request for first uses of an identified application program based on the pricing information associated with the identified application program, the identified application program having been selected by the user from the application programs presented by the electronic store application program via the user interface of the electronic store application program, and the first purchase request being generated by the electronic store application program and received from the electronic store application program via the application programming interface and the carrier application store client program running at the computing device;

upon receipt of a second response including a first license for the first uses of the identified application program by the carrier application store client program from the carrier applications store server, send the first license for first uses of the identified content item to the electronic store application via the application programming interface at the computing device;

send, by the electronic store application program, a copy of the first license for the identified application program to an electronic store server, separate from the carrier applications store server; and receive, at the computing device, the identified application program directly from the electronic store server in response to sending the license to the electronic store server, the requested application program interacting with the first license to provide the first uses of the identified application program on the computing device;

send, by the electronic store application program running on the computing device, a second purchase request to the carrier applications store server, the second purchase request being for second uses of the identified application program based on the pricing information associated with the identified application program, the second purchase request being generated by the electronic store application program and received by the carrier application store client program from the electronic store application program via the application programming interface;

upon receipt, by the carrier application store client running on the computing device, of a third response including a second license for the second uses of the identified application program from the carrier applications store server, send the second license for the second uses of the identified application program to the electronic store application program via the application programming interface;

wherein the identified application program, running on the computing device, interacts with the second license to provide the second uses of the identified application program on the computing device in response to a request from a user.

15. The article of claim 14, wherein the user interface of the electronic store application program presents to the user via the display of the computing device an option to enable direct carrier billing for purchasing selected content items.

16. The article of claim 14, wherein the digital pricing information includes a plurality of price ranges for the application programs based on pricing models specified by the third-party provider, each pricing model representing a type of permissible use of the application programs at the mobile device of the user; and wherein the pricing models specified by the third-party provider include a one-time use model, a time-restricted model, a subscription-based pricing model, and an unlimited use model.

17. The article of claim 16, wherein the purchase request for the identified application program includes a price range selected from the plurality of price ranges, a price for the identified application program, and a unique identifier for the identified application program in the electronic store application.

18. The article of claim 17, wherein the purchase request further includes a name of the identified application program that is dynamically generated by the electronic store application program using the application programming interface in response to the user's selection of the content item for purchase.

19. The article of manufacture of claim 14, wherein the computer-executable instructions further cause the computing device to authenticate the first and second digital licenses upon receipt of the first and second licenses from the carrier applications store server.

* * * * *